United States Patent [19]

Carr

[11] Patent Number: 5,777,045
[45] Date of Patent: Jul. 7, 1998

[54] POLYGYLCIDYL ESTER-BASED POWER COATINGS

[75] Inventor: Lawrence J. Carr, Elk Grove Village, Ill.

[73] Assignee: Amoco Corporation, Chicago, Ill.

[21] Appl. No.: 640,827

[22] PCT Filed: Dec. 8, 1994

[86] PCT No.: PCT/US94/14101

§ 371 Date: Aug. 23, 1996

§ 102(e) Date: Aug. 23, 1996

[87] PCT Pub. No.: WO95/16753

PCT Pub. Date: Jun. 22, 1995

Related U.S. Application Data

[63] Continuation-in-part of Ser. No. 169,974, Dec. 17, 1993, abandoned.

[51] Int. Cl.$^6$ .................. C08F 20/00; C08L 63/00
[52] U.S. Cl. .................. 525/438; 525/533; 525/934
[58] Field of Search .................. 525/438, 533, 525/934

[56] References Cited

U.S. PATENT DOCUMENTS

| | | | |
|---|---|---|---|
| 3,985,825 | 10/1976 | Schmid et al. | 260/835 |
| 4,010,289 | 3/1977 | Kobayashi et al. | 427/54 |
| 4,112,012 | 9/1978 | de Cleur et al. | 260/835 |
| 4,145,370 | 3/1979 | Sreeves | 260/835 |
| 4,339,571 | 7/1982 | Gutekunst et al. | 528/361 |
| 4,356,285 | 10/1982 | Kumagai | 525/111 |
| 4,421,897 | 12/1983 | Gutekunst et al. | 525/119 |
| 4,463,140 | 7/1984 | Belder et al. | 525/438 |
| 4,904,746 | 2/1990 | Brown et al. | 525/438 |
| 4,952,645 | 8/1990 | Mulhaupt et al. | 525/438 |
| 5,006,612 | 4/1991 | Danick et al. | 525/438 |
| 5,034,432 | 7/1991 | Ueno et al. | 523/221 |
| 5,162,058 | 11/1992 | Uenaka et al. | 106/287.24 |
| 5,168,110 | 12/1992 | Van Den Elshout et al. | 525/438 |
| 5,250,634 | 10/1993 | Toyoda et al. | 525/438 |
| 5,272,187 | 12/1993 | Gross et al. | 523/402 |

FOREIGN PATENT DOCUMENTS

| | | |
|---|---|---|
| 387692 | 3/1989 | European Pat. Off. |
| 2758006 | 5/1979 | Germany |
| 069935 | 6/1977 | Japan |
| 108166 | 12/1980 | Japan |
| 118436 | 6/1983 | Japan |
| 230069 | 6/1983 | Japan |
| 1311553 | 3/1973 | United Kingdom |

OTHER PUBLICATIONS

WPI Derwent Abstract, AN 84–072523.

*Primary Examiner*—Randy Gulakowski
*Attorney, Agent, or Firm*—Mary Jo Kanady; Wallace L. Oliver

[57] ABSTRACT

This invention relates to thermally-stable, polyglycidyl-terminated polyesters from diglycidyl phthalates and carboxylated polyesters. The resulting resins, when blended and cured with other carboxylated polyesters, are improved binders for powder coating and other applications. The invention also relates to polyglycidyl ester-based powder coating compositions containing these resins.

38 Claims, No Drawings

POLYGYLCIDYL ESTER-BASED POWER COATINGS

FIELD OF THE INVENTION

This application is a 371 PCT/US94/14101 filed Dec. 8, 1994, and is a continuation-in-part of U.S. Ser. No. 08/169,974 filed Dec. 17, 1993, now abandoned.

This invention relates to thermally-stable, glycidyl-terminated polyesters from diglycidyl phthalates and carboxylated polyesters. The resulting resins, when blended and cured with other carboxylated polyesters, are improved binders for powder coating applications. The invention also relates to polyglycidyl ester-based powder coating compositions containing these resins.

BACKGROUND OF THE INVENTION

The binder resins of the present invention are used in powder coatings as a replacement for co-reactants in current systems which contain either hazardous components, such as triglycidyl isocyanurate, or curatives that produce volatile by-products, or an epoxy resin containing bisphenol-A. The powder coating formulation of the present invention contains a binder resin blend with a glass transition temperature (Tg) of about 50° C. or greater, cures to a thermoset in about 20 minutes or less at about 200° C. to about 250° C. and preferably in less than about 10 minutes at about 200° C. to about 205° C., does not produce a volatile by-product during cure, displays resistance to UV exposure, and does not sinter or cake when stored under hot ambient conditions.

"Hybrid resins", which are commercial binders for powder coatings are mixtures of resins containing carboxylated polyesters and diglycidyl ethers of bisphenol-A (DGEBA). Their use in coatings has the disadvantage of being limited to interior applications because of the UV (ultraviolet irradiation) instability (poor weatherability) of the DGEBA. This instability has been attributed to the presence of bisphenol-A. For exterior applications, the DGEBA is replaced with other epoxy derivatives, such as triglycidyl isocyanurate (TGIC) or with β-hydroxyalkylamides. However, these replacement products also have disadvantages. For example, TGIC is considered hazardous, and β-hydroxyalkylamides give off water as a by-product during cure which can cause pinholes in the coating, thus rendering unsatisfactory. Powder coating formulations which emit a volatile by-product such as water vapor cannot be used for thicker coatings.

Different types of carboxylated polyester resins are used, depending on the type of co-curative. TGIC and β-hydroxyalkylamides are trifunctional and tetrafunctional (or greater), respectively, so a carboxylated polyester with carboxyl substitution of 1.1 to 2.5 per chain, preferably 1.8 to 2.5 per chain, is used for crosslinking. However, a hybrid resin, which contains a diepoxide, requires a polyester containing an average of at least about 2.1 and preferably about 3 to about 4 or more carboxyl groups for crosslinking.

Carboxylated polyesters (i.e., carboxyl-terminated polyesters) which are used in powder coatings are prepared primarily from terephthalic acid and neopentyl glycol. Co-reactants, such as trimellitic anhydride, trimethylolpropane, and pentaerythritol are often added to give higher carboxyl functionality by chain branching. Other co-reactants such as isophthalic acid, adipic acid, ethylene glycol, etc. are also added to afford the desired physical properties of the final coating.

An important property which is desirable in a powder coating formulation is that it be stable when stored under hot ambient conditions. The formulation should not sinter into a non-friable mass at 45° C. because many storage facilities may have an ambient temperature of 45° C. and sintering or caking of the powder coating formulation on storage at this temperature would destroy its usefulness. Generally, resins with a glass transition temperature (Tg) of about 50° C. or higher will not sinter at 45° C. Therefore an important property desired for the blend of carboxylated polyester and the co-curative is that the glass transition temperature (Tg) be about 50° C. or greater. This is to prevent caking or "blocking" of the powder while it is being stored under hot, ambient conditions or in the feed section of an extruder.

JP-188436 discloses a resin mixture for powder paint use comprising a polyester resin (I) having an acid value of 20–150 and a softening point of 50°–160° C. and an epoxy group-containing polyester resin (II) having an epoxy equivalent of 400–2500 and a softening point of 40°–160° C. The epoxy polyester resin (II) is prepared by the reaction of a polyester resin, which contains at least 30 mole % of aromatic dicarboxylic acid as the acid component and has an acid value of 25–200, with an epoxy compound, which contains at least two epoxy groups in one molecule, in a mixing ratio of epoxy group/carboxyl group=3/1~1.5/1 (molar ratio_ and carboxyl group degree of reaction of 25 ~85 equivalent %. At page 5, lines 30–31, of the English translation it is stated that if the degree of reaction of the carboxyl group is more than 85 equivalent %, a smooth film cannot be obtained. And on page 6, lines 9–13, it is stated that if the content of the polyester resin (I) is more than 80 weight % or is less than 30 weight %, a resin mixture for powder paint use, which has a good storage stability and can generate a film with a smooth coating surface and excellent weather resistance, cannot be obtained. The powder paint made from the resin is said to be stable on storage at 35° C. whereas the powder coating composition of the present invention is stable on storage at 45° C. and has greater than 85% carboxyl group degree of reaction.

U.S. Pat. No. 5,350,634 (Toyoda, et al.) discloses a powder coating comprising (A) a carboxyl group-containing resin having a number average molecular weight of 1,000–30,000, and acid value of 5–200 KOH mg/g and a glass transition temperature of 20°–120° C., and (B) a polyglycidyl compound having on average 2 to 6 glycidyl groups in its molecule, obtained by the addition reaction of a polyester oligomer having 2 or more carboxyl groups in its molecule and having a number average molecular weight of 200 to 1200, with an epoxy compound (TGIC) of the formula (I) in which $R_1$, $R_2$, and $R_3$ are the same or different groups and each represents hydrogen or methyl and/or a derivative thereof having, on average, glycidyl groups in its molecule, the ratio of carboxyl groups in (A) resin to glycidyl groups in (B) being in terms of functional group equivalent ratio, 0.5 to 2.0. The Toyoda, et al. powder coatings are limited to compositions which contain triglycidyl isocyanurate (TGIC). At column 5, line 24–25, it is stated that "a part" of compound B may be substituted with other epoxy compound or resin having two or more glycidyl groups in its "molecule". However, there is no teaching of how much of such "other epoxy compound" could be used in addition to TGIC in the Toyoda compound (B), and there is no exemplification of the use of anything other than TGIC alone in Toyoda's compound (B). Furthermore, the polyester oligomer of Toyoda cannot have a number average molecular weight greater than 1200. At column 4, lines 55–57 of Toyoda it is stated that if the polyester oligomer has a number average molecular weight greater than 1200 "there is a shortage of flow property of coating, resulting in a poor appearance coating."

U.S. Pat. No. 4,112,012 (1978) discloses that binder resins for powder coatings can be mixtures of a carboxylated polyester with an average carboxyl functionality greater than one per chain and a diglycidyl phthalate.

The acid number (AN) of the polyester is between 20–150 mg KOH/g. A subsequent patent (U.S. Pat. No. 4,463,140; 1984), states that these powder coatings have several disadvantages. For example, a low Tg for the above resins was cited as a disadvantage of such systems, such that the resulting powders have problems with free-flowing stability after being exposed to hot, ambient conditions. The latter patent discloses that by use of a higher molecular weight carboxylated polyester (AN 10–30), less diglycidyl phthalate is required for cure. This results in a binder resin blend with a higher Tg. The maximum amount of diglycidyl phthalate disclosed in this patent is 9.0 wt. %.

Two patents (U.S. Pat. No. 4,339,571; 1982 and U.S. Pat. No. 4,421,897; 1983) disclose that an aliphatic carboxylated polyester resin with a carboxyl functionality greater than one can react with a diglycidyl phthalate (1 equivalent carboxyl group per 2 equivalents epoxide groups) to result in a glycidyl terminated polyester which can be cured with epoxy curing agents, such as imidazoles. Although Tg temperatures were not reported, it is well known that aliphatic polyesters have Tg temperatures less than 50° C. These resins are said to be useful for saturating or coating fabric or non-woven materials for the preparation of prepregs or adhesive tapes or for coating substances on which an adhesive bond is to be produced. In order to be suitable for these uses the resin would have to be flexible and not brittle.

The present invention describes the preparation and applications of thermally-stable, polyglycidyl-terminated polyesters from diglycidyl phthalates and carboxylated (i.e., carboxyl-terminated) aromatic polyesters. The resulting resins, when blended and cured with other carboxylated polyesters, are binders for powder coating applications. The amount of polyglycidyl ester used in preparing the binder resins is preferably about 10 weight percent or greater.

An objective of the present invention is to provide a curable binder resin system containing a resin having an average epoxy functionality greater than 1 and a carboxylated polyester having a carboxyl functionality greater than 2 which will thermally cure to a thermoset in about 20 minutes or less, preferably in about 15 minutes or less at about 200° C. to about 250° C., preferably at about 200° C. to about 205° C., and more preferably in about 10 minutes or less at about 200° C. to about 250° C., preferably at about 200° C. to about 205° C., although it may also cure at temperatures as low as 150° C. or even 130° C.; it will possess a Tg of about 50° C. or higher, and will not sinter when stored at 45° C., will not produce a volatile by-product during cure, and will result in a cured coating which demonstrates weatherability, i.e., resistance to yellowing and loss of gloss upon exposure to UV irradiation.

SUMMARY OF THE INVENTION

The present invention relates to a powder coating binder resin composition comprising:

(a) a resin comprising a polyglycidyl-terminated polyester formed from the reaction of an excess of a polyglycidyl compound with a carboxylated polyester (I) having an average of about 1.8 to about 2.1 or more equivalents of carboxyl groups and a number average molecular weight greater than about 1000, preferably greater than about 1500, and (b) a carboxylated polyester (II) having greater than about 2.5 free carboxyl groups per molecule and an acid number between about 50 and about 150 mg KOH/g;

The powder coating binder resins of the present invention have a glass transition temperature ($T_g$) of about 50° C. or greater and cure to a thermoset in about 10 to about 15 minutes or less at about 200° to about 250° C.

DETAILED DESCRIPTION OF THE INVENTION

The present invention provides a polyglycidyl ester-based powder coating which preferably cures to a thermoset in less than 10 minutes at about 200° C. and which comprises a resin formed by melt blending from about 50 to about 80 weight percent, preferably about 60 to about 80 weight percent, and more preferably about 70 to about 80 weight percent, of a polyglycidyl-terminated carboxylated polyester (AN less than about 5) with about 50 to about 20 weight percent, preferably about 40 to about 20 weight percent, and more preferably about 30 to about 20 weight percent, of carboxylated polyester (AN about 60 to about 100).

The present invention relates to curable, thermally-stable, polyglycidyl-terminated polyester resins from polyglycidyl esters and carboxylated polyesters and to binders for powder coating applications which are prepared by blending and curing these resins with other carboxylated polyesters. The invention also relates to powder coating compositions prepared from the polyglycidyl-terminated polyester resins. The powder coating formulations of the invention will thermally cure to a thermoset in about 20 minutes or less at about 200° C. to about 250° C., preferably in about 15 minutes or less at about 200° C. to about 205° C., and more preferably they will cure to a thermoset in about 10 minutes or less at about 200° C. to about 205° C., will have a $T_g$ equal to or greater than about 50° C., will not sinter or cake when stored at hot ambient temperatures, and will not produce a volatile by-product during cure. Preferably the $T_g$ of the powder coating compositions of the present invention will be from about 50° C. to about 80° C. and more preferably the $T_g$ will be from about 55° 0C. to about 65° C. When thermally cured, the powder coating compositions of the present invention provide a cured coating which has good weatherability, i.e., which has good resistance to yellowing and loss of gloss when exposed to ultraviolet irradiation.

The present invention also comprises a binder resin comprising a polyglycidyl-terminated polyester adduct formed from the reaction of an excess of a polyglycidyl compound, preferably a diglycidyl compound, with a polyester (I) (preferably an aromatic polyester) having an average of about 1.8 to about 2.1 or more equivalents of carboxyl groups (about 2.0 equivalents of carboxyl groups is preferred) and a number average molecular weight greater than about 1000. Preferably the carboxylated polyester (I) has a number average molecular weight from about 1500 to about 7500 and more preferably the range is from about 2200 to about 4500. Polyester (I) is a carboxyl-terminated polyester and is preferably a linear polyester, however, it may be slightly branched. A "slightly branched" polyester generally will have less than 1 mole percent of a triol, e.g. trimethylolpropane; tetraol; tricarboxylic acid; and the like having a functionality greater than 2 included in the preparatory formulation at a concentration of about 1 mole percent or less. If a polyester (I) of the present invention is slightly branched, the amount of branching should be low enough that when the polyester is mixed with a polyglycidyl compound such as diglycidyl isophthalate at a temperature of about 200° C., the reaction mixture will not gel within about 20 minutes and preferably will remain fluid and not gel when held for 30 minutes or more at about 200° C. When the polyester (I) of the present invention is reacted with diglycidyl isophthalate or another diglycidyl or polyglycidyl compound, the carboxyl conversion is greater than about 70%, preferably greater than about 75%, more preferably greater than about 80%, and most preferably greater than about 85%, and there is no gelation when the reaction mixture is held at 200° C. for about 20 minutes.

Polyesters that form a gel with diglycidyl compounds when heated to 200° C. for 20 minutes or less are not suitable for use as the polyester (I) of the present invention which is combined with a polyglycidyl compound to form a polyglycidyl-terminated polyester adduct (i.e., an epoxy polyester adduct) which is then melt blended with carboxylated polyester (II) to form the powder coating of the present invention.

When a polyester (I) is reacted with a diglycidyl or polyglycidyl compound to form the polyglycidyl-terminated polyester adduct, the carboxyl conversion is preferably about 85% or greater, more preferably about 86 to about 100% and most preferably about 90% or greater. The $T_g$ of the polyglycidyl-terminated adduct is preferably between about 50° C. and about 70° C. with about 60° C. being preferred. Preferably the polyglycidyl compound used to make the polyglycidyl-terminated polyester adduct is a glycidyl phthalate, and most preferably, it is diglycidyl isophthalate.

In addition to its use in the powder coatings of the present invention, the polyglycidyl-terminated polyester adduct may also be used as a resin in applications where epoxy resins based on bisphenol A are used. These include liquid coatings, reinforced composites, adhesives, foams, electronic encapsulants, inks and resists, aggregates, and as percursors to other derivatives, such as "vinyl esters." Other applications for the epoxy polyester adduct of the present invention include those described in "Epoxy Resins-Chemistry and Technology"; May, Clayton A., Ed.s 2nd edition; Marcel Dekker, New York 1988, incorporated herein by reference in its entirety.

The polyglycidyl-terminated polyester adduct is prepared by reacting greater than 9 weight % (about 15 to about 20 wt. %, preferably about 17 wt. %) of a polyglycidyl compound, preferably a diglycidyl phthalate, with about 85 to about 80 wt. % of a carboxylated polyester (I) having an AN of about 25 to about 50, preferably about 35, at about 120° C. to about 225° C., preferably about 130° C. to about 200° C. and optionally, in the presence of a catalyst. The reaction can be carried out in any suitable reaction vessel, static mixer, or extruder.

The polyglycidyl compound used to prepare the polyester adduct is selected from diglycidyl and polyglycidyl esters of aromatic, aliphthatic, cycloaliphatic dicarboxylic acids or polycarboxylic acids such as phthalic acid, isophthalic acid, terephthalic acid, tetrahydrophthalic, hexahydroterephthalic acid, adipic acid, triglycidyl ester of trimellitic acid, and the tetraglycidyl ester of pyromellitic acid.

Suitable catalysts for use in this reaction are quaternary amines such as, for example, tetramethylammonium chloride and choline chloride, imidazole derivatives, tertiary amines, polyamino compounds, phosphonium salts, and boron trifluoride complexes.

The polyglycidyl-terminated polyester binder resin of the present invention is terminated at both ends with epoxide groups and has a number average molecular weight greater than about 1000. It does not self-cure to a thermoset in 20 minutes or less upon heating to 200° C.; however, when it is melt mixed with a carboxylated polyester (II) (which is preferably a branched, carboxyl-terminated polyester) having an AN of about 50 to about 150, and preferably about 60 to about 100, the resulting powder coating resin composition has a Tg of about 50° C. or greater and cures to a thermoset in about 20 minutes or less at about 200° C. to about 250° C., and preferably in about 10 minutes or less upon heating to about 200° C. to about 205° C.

The glycidyl-terminated polyester has about 2 or more epoxide groups per molecule with an average of about 2 epoxide groups per mole.

The carboxylated polyester (II) which is melt blended with the above glycidyl-terminated polyester resin to form the powder coating composition of the invention is derived from at least one polyalcohol and one polycarboxylic acid which is predominantly aromatic and, preferably, has about three to four carboxyl groups per mole. These polyester resins preferably have an acid number of about 50 to about 150 with about 70 to about 100 being more preferred, and a number average molecular weight greater than 1000, preferably from about 2000 to about 6000 and more preferably from about 2500 to about 5000 with a range of about 2800 to about 4000 being more preferred and about 3000 being most preferred.

Polyalcohols for use in preparing the above carboxylated polyester (II) preferably comprise lower aliphatic diols such as ethylene glycol, propane-1,2-diol, propane-1,3-diol, butane-1,2-diol, butane-1,3-diol, butane-1,4-diol, 2,2-dimethyl-1,3-propanediol (neopentyl glycol), hexane-2,5-diol, hexane-1,6-diol, 2,2-|bis-(4-hydroxycyclohexyl)| propane, 1,4-dimethylolcyclohexane, diethylene glycol, dipropylene glycol, 2,2-bis-|4-(3-hydroxyethoxy)| phenylpropane, trimethylolpropane, and pentaerythritol with neopentyl glycol being preferred. Preferably the alcohol component contains at least about 50 mole percent neopentyl glycol.

The carboxylated polyesters (II) which are melt mixed with the glycidyl-capped polyesters in the present invention, may be prepared from substantially aromatic polycarboxylic acids such as terephthalic acid, phthalic acid, isophthalic acid, benzene-1,2,4-carboxylic acid, pyromellitic acid, trimesic acid, 3,6-dichlorophthalic acid, and tetrachlorophthalic acid, with terephthalic acid being preferred as the major component. The average carboxyl functionality is preferably about 3 to about 4 and the acid number (AN) is preferably about 50 to about 150 with about 70 to about 100 being preferred and about 75 to about 100 more preferred.

About 50 to about 80 weight % (preferably about 60 to about 80 weight percent, and more preferably about 70 to about 80 weight percent) of the polyglycidyl carboxylated polyester adduct (AN less than about 5) is melt blended at about 120° C. to about 150° C., preferably about 130° C. to about 135° C., with about 50 to about 20 weight percent (preferably about 40 to about 20 weight percent, and more preferably about 30 to about 20 weight percent) of the carboxylated polyester (II) (AN about 50 to about 150) to form the powder coating resin composition of the present invention.

The powder coating resin compositions of the present invention comprise:

(a) a binder resin comprising a linear or slightly branched polyglycidyl-terminated polyester having an average of about 1.8 to about 2.1 or more equivalents (preferably about 2.0 equivalents) of epoxy groups and a number average molecular weight greater than about 1000, and preferably greater than about 1500, and (b) a carboxylated polyester (II) having greater than about 2.5 free carboxyl groups per mole and an acid number between about 50 and about 150 mg KOH/g wherein said composition has a glass transition temperature of about 50° C. or greater and cures to a thermoset in about 20 minutes or less at about 200° C. to about 250° C. and preferably in about 10 minutes or less at about 200° C.

Cargill 30-3051 is a highly reactive branched carboxyl-terminated saturated polyester resin available from Cargill Chemical Products Division, Minneapolis, Minn. It has the following properties:

Viscosity, ICI Method @200° C. (POISE): 25–45

Equivalent Weight: 561–660

Acid No. (Solids Basis): 85–100 (Titration indicated an AN of 101 for some samples)

Specific Gravity: 1.1–1.2

Tg°C.: 63±3

Cargill 30-3065 is a linear carboxyl-terminated saturated polyester resin available from Cargill Chemical Products Division, Minneapolis, Minn. It has the following properties:

Viscosity, ICI Method @200° C. (POISE): 30–45

Equivalent Weight: 1602–1870

Acid No.: 30–35

Specific Gravity: 1.1–1.2

Tg°C.: 58±3

Modarez MFP is an acrylate copolymer on a silica carrier and is available from Synthron, Inc., Morganton, N.C.

Triglycidyl isocyanurate is PT-810 available from Ciba-Geigy, Hawthorne, N.Y.

Primid® XL-552 (β-hydroxyalkylamide) is available from Rohm & Haas, Philadelphia, Pa.

Modaflow III is an acrylate copolymer resin modifier on a silica carrier and is available from Monsanto Polymer Products, St. Louis, Mo.

EPON® 1001F epoxy resin is a solid bisphenol-A/epichlorohydrin epoxy resin of epoxide equivalent weight: 525–550 and is available from Shell Chemical Company, Houston, Tex. It has the following properties:

Epoxide equivalent weight: 525–550

Viscosity, Centipoise at 25° C.: 7.0–9.6

Melt Viscosity, Cannon-Fenske cSt, at 150° C.: 600–750

Weight/gallon, at 68° C., lbs.: 10.2

Esterification equivalent weight: 145

Melting point °C.: 75–80

Hydroxyl content, equivalents/100 grams: 0.29

EPON® 2002 epoxy resin is a solid bisphenol-A/epichlorohydrin epoxy resin of epoxide equivalent weight: 675–760 and is available from Shell Chemical Company, Houston, Tex. It has the following properties:

Epoxide equivalent weight: 525–550

Viscosity, Centipoise at 25° C.: 10–17

Melt Viscosity, Cannon-Fenske cSt, at 150° C.: 1900–3000

Weight/gallon, at 68° C., lbs.: 10.2

Rucote® 551 is a branched carboxyl-terminated polyester powder coating resin. It is available from Ruco Polymer Corporation, Hicksville, N.Y. It has the following properties:

Viscosity (ICI Cone & Plate @200° C.), poise: 25

Hydroxyl No.: <10

Acid No.: 85

Acid Equivalent Weight: 660

Rucote® 915 is a linear carboxylic acid-terminated polyester powder coating resin designed for use with hydroxyalkylamide curatives such as Rohm & Haas PRIMID® XL-552. It is available from Ruco Polymer Corporation, Hicksville, N.Y. It has the following properties:

Viscosity (ICI Cone & Plate @200° C.), poise: 35–55

Hydroxyl No.: <7

Acid No.: 33–41

Tg°C.: >55

Acid Equivalent Weight: 1520

DSM Uralac P 2400 is a saturated, carboxylated polyester resin. It is available from DSM Resins U.S., Inc. Elmwood Park, N.J. and has the following properties:

Viscosity dPa.s: 400–600

Acid Value: 32–38

Tg°C.: approx. 62

DSM Uralac P 4127 is a saturated, carboxylated polyester resin. It is available from DSM Resins U.S., Inc. Elmwood Park, N.J. and has the following properties:

Viscosity dPa.s: 70–170

Acid Value: 70–185

Tg°C.: approx. 50

Resinflow P-67 is an acrylic polymer and silica mixture available from Estron Chemical, Calvert City, Ky.

The following procedures (a) Gel Time Reactivity and (b) Accelerated Stability Test-Powder Coating are testing procedures recommended by The Powder Coating Institute, 1800 Diagonal Road, Suite 370, Alexandria, Va. 22314.

GEL TIME REACTIVITY (STROKE CURE) TEST

Gel time reactivity, often referred to as "stroke cure," is the time required for a coating powder to advance to a gelled state through a liquid phase at a defined temperature. It is a factor that affects surface appearance and indicates the reactivity of the coating. The range for any given gel time is generally plus or minus ten percent (±10%) compared to the control material.

This test is used to determine the hot plate gel time characteristics of a finished coating powder.

APPARATUS:

1) Hot plate capable of holding a 200°±2° C. temperature.
2) Stop watch or electric timer (0.1 second intervals).
3) Wooden applicators; 5/64×5¾ in. (2×146 mm).
4) ¼ teaspoon or suitable measuring device capable of measuring approximately 0.9 gram powder (Micro spatula).

PROCEDURE:

1) Measure out approximately a ¼ teaspoon sample of finished powder using the measuring device.
2) Drop sample onto central area of hot plate and simultaneously start timer. Rub the powder with the tip of the wooden applicator stick in a one inch (25 mm) diameter circle. Continue this motion with slight pressure until a solid gel is produced as found by lifting the applicator at least 2 in. (50 mm) from the hot plate. If the material produces a continuous filament from the plate to the applicator, it has not gelled.
3) Stop the timer when the strand breaks readily. Repeat the test with a fresh sample.

REPORT: Total time to end of test (when gelation occurs) in seconds.
NOTE:
1) Test should be run in duplicate by the same individual.
2) Tests should not be performed in outer areas of hot plate where surface temperatures tend to vary considerably.
3) Hot plate to be periodically checked prior to and after testing with surface pyrometer to insure proper temperature control.
4) The temperature of the hot plate may be varied as agreed upon by customer and supplier.

ACCELERATED STABILITY TEST-POWDER COATINGS

A powder coating has to be easily fluidized and free-flowing in order to be properly applied. In addition it has to melt, flow out, and eventually form a coating possessing the esthetic and protective properties desired.

A powder user has to know, or be able to determine, the physical and chemical stability of a powder in order to determine its usability. This test procedure provides an accelerated method of comparing an unknown powder against a standard with similar chemistry. This procedure is only an indication of the shelf life of a powder. Many variables, such as temperature, moisture, and pressure, affect the actual life of a power sample.

This test is used to provide an accelerated measure of a powder coatings physical and chemical stability.
APPARATUS:
1) Small (4 ounce) wide mouth glass bottle with lid.
2) Water bath capable of maintaining a constant temperature +0.5° C.
3) Thermometer.
PROCEDURE:

Approximately two-thirds (⅔) of the glass bottle is filled with the powder sample. The lid is placed upon the bottle. The closed container is then placed into the constant temperature water bath in such a manner that the water level is above the powder level but not over the top of the container. The temperature of the water bath can be varied, but 45° C. is recommended for the majority of powder formulations. If the powder formulation is unusually fast reacting or if the operator wishes to extend the testing period to emphasize differences between powders, 40° C. is recommended.

To evaluate physical stability, the powder sample is removed from the water bath (usually at a twenty-four (24) hour interval) and allowed to cool to room temperature. The bottle is then gently rotated and the free flowing nature of the powder noted. If the powder is no longer free flowing, or contains lumps, the lid is removed and the powder probed with a small spatula to determine the degree of compaction. The test is discontinued when the powder is no longer free flowing and/or the lumps cannot be easily broken.

To evaluate chemical stability, a gel time is performed prior to the powder being subjected to the constant temperature water baths. Periodically, (not as frequently as physical evaluation due to the small size) a small amount of powder is removed from the jar after the sample has reached equilibrium with room temperature. Gel time is then performed on this sample and the results compared to the original readings. Test procedures until physical stability fails or until the powder is incapable of having a gel time performed.

Test results are reported as the number of days at a specified temperature before physical and/or chemical properties are severely affected.

The following examples will serve to illustrate certain embodiments of the herein disclosed invention. These examples should not, however, be construed as limiting the scope of the invention as there are many variations which may be made thereon without departing from the spirit of the disclosed invention, as those of skill in the art will recognize. Unless otherwise indicated, the formulations are weight percent.

COMPARATIVE EXAMPLE A

As taught in U.S. Pat. No. 4,112,012, a branched carboxylated polyester resin (AN 101 calculated by titration) was melt mixed with diglycidyl isophthalate at 133° C. for 5 minutes (1 equivalent carboxyl per 1 equivalent epoxide). The Tg of the blend was 41° C. The blend was pulverized to a powder and found to cure to a thermoset in 43 seconds at 200° C.

COMPARATIVE EXAMPLE B

A linear carboxylated polyester (AN 35), as taught in U.S. Pat. No. 4,463,140, was melt blended with diglycidyl isophthalate at 133° C. for 5 minutes. The Tg of the resulting blend was 39° C. The latter blend did not cure to a thermoset at 200° C. within 10 minutes.

Neither of the combinations examined in Comparative Examples A and B above resulted in a resin blend with a Tg of 50° C. or greater.

EXAMPLE 1

A carboxylated polyester of 35 AN was reacted with diglycidyl isophthalate (1 equivalent carboxyl per 2 equivalents epoxide) in the presence of a catalyst (tetramethylammonium chloride) for 1.5 hours at 133° C. The carboxyl conversion was about 95%. Little, if any, gelation occurred during this period. The resulting glycidyl-terminated polyester had an acid number of 1.6 and an epoxy equivalent weight (EEW) of 1930. This polyester was subsequently melt mixed for 5 minutes at 133° C. with a carboxylated polyester of 101 AN (1 equivalent carboxyl per 1 equivalent epoxy). The resulting resin blend was easily ground to a fine powder. The blend had a Tg of 57° C. and cured to a thermoset at 200° C. in 5 minutes.

EXAMPLE 2

A glycidyl terminated polyester was prepared from diglycidyl isophthalate and a carboxylated polyester (35 AN) as described in Example 1 to provide a resin having a Tg>50°. The resin was melt mixed in an extruder at 133° C. for 5 minutes with another carboxylated polyester (101 AN), titanium dioxide pigment (30 wt %), a catalyst (choline chloride), and other additives commonly used in powder coating formulations. The resulting powder coating formulation was ground to a powder and electrostatically sprayed onto steel panels. The panels were cured at 400° F. (204° C.) for 15 minutes. Physical properties were measured on the cured panels, and the coatings were subjected to UV exposure. The coating of Example 2, had a UV resistance which was superior to a powder coating formulation based on bisphenol-A and was nearly equivalent to powder coatings currently used for exterior applications.

In the above examples a carboxylated polyester resin with a carboxyl functionality of 1.1–2.5 (preferably 1.8–2.1) was reacted with a diglycidyl ester (2 equivalents of epoxide per one equivalent of carboxyl). The resulting resin had a polyester backbone, and was capped with glycidyl groups.

EXAMPLE 3 a) Starting Material

Diglycidyl isophthalate (DGI) was prepared by caustic treatment of the product from the catalytic reaction of isophthalic acid with a molar excess of epichlorohydrin. The resulting white solid, which melted at 60°–65° C., contained 10.0–10.5 wt % oxirane oxygen (153–160 EEW).

b) Glycidyl-terminated Polyester Adduct

A carboxylated polyester/DGI adduct was prepared by charging a 500 mL resin kettle with 200 g of Cargill 30-3065 carboxylated polyester (35 AN), 38.0 g diglycidyl isophthalate, and 0.3 g choline chloride catalyst. The mixture was melted and stirred at 133° C. for 1.5 hour. The carboxyl conversion was about 95%. The isolated product was solid resin at room temperature and had an acid number of 1.6. The epoxide content was 0.72 wt % oxirane oxygen (EEW 2200). The resin did not form a thermoset upon heating at 200° C. for 10 minutes.

c) Final Cure

A Brabender mixing head at 133° C. was charged with 30.07 g of the polyester/epoxy adduct of Example 3(b), 8.69 g of Cargill 30-3051 (AN 101) carboxylated polyester, and 29.24 g of titanium dioxide. The blend was fluxed for 5 minutes at 133° C. and removed. The resulting resin, which was easily pulverized to a free flowing powder, cured to a thermoset at 200° C. in 5 minutes. The Tg before cure was 57° C.

Samples for powder coating performance testing (Example 4 and Comparative Examples C, D, and E) were prepared in a compounding extruder. The experimental and control formulations were:

EXAMPLE 4

| Material | Wt. %* |
| --- | --- |
| Glycidyl-terminated Polyester Adduct of Example 3(b) | 53.7 |
| Cargill 30-3051 polyester (AN 101) | 14.2 |
| Modarez MFP (acrylate copolymer on a silica carrier) | 1.2 |
| Benzoin | 0.8 |
| Choline chloride | 0.12 |
| Titanium dioxide (R-900) | 30.0 |

Melt temperature: 210° F. (98.9° C.)
*weight percent of the total formulation

COMPARATIVE EXAMPLE C

Commercial Example Containing TGIC

| Material | Wt. % |
| --- | --- |
| Cargill 30-3065 polyester (AN 35) | 54.6 |
| Triglycidyl isocyanurate (TGIC) | 4.1 |
| Modarez MFP | 0.8 |
| Benzoin | 0.5 |
| Titanium dioxide | 40.0 |

Melt temperature: 222° F. (105.6° C.)

The TGIC containing material is PT-810 which is available from Ciba-Geigy, Hawthorne, N.Y.

COMPARATIVE EXAMPLE D

Commercial Example Containing β-hydoxyalkylamide

| Material | Wt. % |
| --- | --- |
| Cargill 30-3065 polyester (AN 35) | 55.8 |
| Primid XL-552 (β-hydroxyalkylamide)* | 2.9 |
| Modaflow III (acrylate copolymer resin modifier on a silica carrier) | 0.75 |
| Benzoin | 0.5 |
| Titanium dioxide | 40.0 |

Melt temperature: 280° F. (137.8° C.)
*Primid XL-552 is available from Rhom & Haas, Philadelphia, Pennsylvania

COMPARATIVE EXAMPLE E

"Hybrid" Commercial Resins

| Material | Wt. % |
| --- | --- |
| Cargill 30-3051 polyester (AN 101) | 41.6 |
| EPON 1001F epoxy resin* | 11.2 |
| EPON 2002 eopxy resin* | 15.0 |
| Modarez MFP | 1.2 |
| Benzoin | 0.8 |
| Choline chloride | 0.2 |
| Titanium dioxide | 30.0 |

Melt temperature: 220° F. (104.4° C.)

EPON Commercial Resins are available from Shell Chemical Company, Houston, Tex.

TABLE I

Physical Properties of Cured Coatings
Cure Conditions: 400° F. (204° C.) for 15 min.

| Initial Physical Property | Example 4 | Example C | Example D | Example E |
| --- | --- | --- | --- | --- |
| Film Thickness (mils) | 1.7 | 1.8 | 2.0 | 1.8 |
| Gloss, 60° | 85 | 92 | 92 | 94 |
| Impact - direct (in-lbs) | 50 | 90 | 130–140 | 150–160 |
| Impact - reverse (in-lbs) | 20 | 80 | 80 | 160 |
| Conical Bend (% pass) | 100 | 100 | 100 | 100 |
| Hardness, Sward | 24 | 26 | 26 | 32 |
| Hardness, pencil (no cut) | 2–3H | 3H | 2–3H | 2H |
| Crosshatch - Adhesion (% pass) | 100 | 100 | 100 | 100 |

Table I demonstrates that the formulations of the present invention have acceptable properties when compared to current commercial materials.

TABLE II

Physical Properties of Cured Coatings
Retention of Gloss to UV Exposure

| UV (Bulb-B) Exposure Hours | Example 4 | Example C | Example D | Example E |
| --- | --- | --- | --- | --- |
| Initial | 83% | 93% | 93% | 93% |
| 100 | 84 | 88 | 92 | 19 |
| 245 | 58 | 86 | 92 | 3 |
| 500 | 18 | 30 | 29 | 1 |
| 750 | 12 | 25 | 24 | 1 |
| 1000 | 8 | 22 | 22 | 1 |

As can be seen in Table II, Comparative Example E deteriorates rapidly as early as 100 hours of exposure. This deterioration is indicative of poor UV stability. On the other hand, it can be seen that the example of the present invention, Example 4, compares favorably in UV stability with the current commercial materials of Comparative Examples C and D.

The measure of yellowness upon exposure to UV is another indication of the ability of the resin to withstand degradation from UV radiation. The higher the Yellowness Index, the worse the degradation of the resin.

TABLE III

Physical Properties of Cured Coatings
Yellowness Index (YI) Upon UV Exposure

| UV (Bulb-B) Exposure Hours | Example 4 | Example C | Example D | Example E |
|---|---|---|---|---|
| Initial | −0.57 | 0.34 | 3.82 | −2.35 |
| 100 | 0.15 | 0.30 | 2.66 | 6.68 |
| 245 | 0.37 | 0.03 | 2.12 | 7.51 |
| 500 | 0.50 | 0.58 | 2.43 | 8.22 |
| 750 | 0.47 | 0.29 | 1.93 | 8.13 |
| 1000 | 0.43 | 0.36 | 1.91 | 8.40 |

Example 4 did not display yellowness to the degree seen in either Comparative Examples D or E. Further, the YI of Example 4 was similar to that of Comparative Example C.

EXAMPLE 5

Diglycidyl isophthalate and diglycidyl orthophthalate were prepared by caustic treatment of the products from the catalytic reaction of the corresponding phthalic acid with an excess of epichlorohydrin. Diglycidyl terephthalate was prepared in toluene from terephthaloyl chloride, glycidol, and triethylamine.

EXAMPLE 6

(a) A carboxylated polyester/diglycidyl isophthalate adduct was prepared by charging a 500 mL resin kettle with 200 g of a commercial carboxylated polyester (Cagill 30-3065; 35 AN), 38.0 g diglycidyl isophthalate (154 EEW), and 0.3 g choline chloride (Actiron CC-6, 60% active) catalyst. The mixture was melted and stirred at 133° C. for 1.5 hour. The isolated product was a solid resin at room temperature with an acid number of 1.6. The carboxyl conversion was about 95%. The epoxide content was 0.72 wt % oxirane oxygen (EEW 2200). The adduct did not cure to a thermoset upon heating at 200° C. for 15 minutes.

(b) A stainless steel resin kettle equipped with a high torque stirrer was charged with 500 g of carboxylated polyester (Rucote 915; 38 AN) and heated to 132° C. with an oil bath. When the melt temperature reached 65° C., agitation was started and 0.78 g of choline chloride added. After the melt temperature stabilized at 132° C., diglycidyl isophthalate (109.25 g; 156 EEW) was added over a 10 minute period. The mixture was stirred for an additional 1 hour at 132°. The resulting adduct had an acid number of 1.1, a midpoint $T_g$ of 50° C., and contained 0.91% oxirane oxygen (EEW 1760). The carboxyl conversion was about 96%.

(c) A glycidyl-terminated polyester adduct was prepared by charging a polymer melt mixing head (C. W. Brabender) at 132° C. with 57.66 g of a carboxylated polyester resin (DSM Uralac P2400; 37 AN) and 0.068 g choline chloride. The blend was fluxed for 10 minutes until temperature and torque readings were constant. Diglycidyl isophthalate (12.34 g; 155 EEW) was added and the blend melt mixed for 30 minutes. The resulting adduct had an acid number of 1.0, a midpoint $T_g$ of 50° C., and contained 0.97% oxirane oxygen (1700 EEW). The carboxyl conversion was about 97%.

(d) To a polymer melt mixing head, preheated to 215° C., were added 57.52 g of a carboxylated polyester (Rucote 915) and 0.068 g choline chloride. The blend was fluxed for 10 minutes. Diglycidyl isophthalate (12.48, 155 EEW) was added to the melt (200° C.), and the mixture blended for 5 minutes. The resulting adduct had an acid number of 1.0. The carboxyl conversion was about 97%.

EXAMPLE 7

(a) A polymer melt mixing head at 133° C. was charged with 30.07 g of the polyester/epoxy adduct of Example 3b, 8.69 g of a carboxylated polyester resin (Cargill 30-3051; AN 101), and 29.24 g of titanium dioxide. The blend was fluxed for 5 minutes at 133° C. and removed. The resulting resin, which was easily pulverized to a free flowing powder, cured to a thermoset at 200° C. in 300 seconds (5 min.). The $T_g$ before cure was 57° C.

(b) A polyester/diglycidyl isophthalate adduct (960 g), prepared by the method described in Example 6b, was premixed with 390 g of a carboxylated polyester resin (Rucote 551; 86 AN), 10 g benzoin, 20 g Resiflow P-67, and 620 g titanium dioxide in a blender. The blend was mixed (99° C. melt temperature) in a twin-screw extruder, and the resulting solid ground to a fine powder. The powder was added to a glass container (⅔ full) and placed in a water bath at 45° C. The sample did not sinter or contract in volume during 24 hours at this temperature.

The powder was electrostatically sprayed onto metal panels and cured at 230° C. for 10 minutes. The cured coating (1.8 mil) had a gloss (60°) of 95% and impact values of 120 in-lb (direct) and 90 in-lb (reverse). After 250 hours of exposure to a QUV-B bulb, the gloss was 88%, compared to 9% gloss for a similar coating in which an epoxy resin based on bisphenol-A was substituted for the polyester/diglycidyl isophthalate adduct.

(c) A polymer melt mixing head, preheated to 132° C., was charged with a mixture of 33.54 g of the adduct of Example 6(c), 15.36 g of a carboxylated polyester (DSM Uralac P4127; 74 AN), 21.00 g titanium dioxide, and 0.068 g of choline chloride. The mixture was fluxed for 4 minutes at 40 rpm, cooled, and ground to a fine powder (<325 mesh) in a Brinkman ZM-1 grinder. The powder, which cured to a thermoset at 200° C. in 100 seconds, was added to a glass container (⅔ full) and placed in a water bath at 45° C. The sample did not sinter or contract in volume during 24 hours at this temperature.

EXAMPLE 8

A glycidyl-terminated polyester adduct was prepared by charging a polymer melt mixing head at 132° C. with 58.60 g of a carboxylated polyester resin (Rucot 915; 38 AN) and 0.083 g choline chloride. The blend was fluxed for 10 minutes until temperature and torque readings were constant. Diglycidyl terephthalate (11.40 g; 139 EEW) was added and the blend melt mixed for 85 minutes. The resulting adduct had an acid number of 1.2, a midpoint $T_g$ of 50° C., and contained 0.93% oxirane oxygen (1700 EEW). The carboxyl conversion was about 96%. A solid mixture was prepared from 38.00 g of this adduct, 11.0 g of a carboxylated polyester (Rucote 551; 86 AN), and 21.00 g titanium dioxide. The mixture was blended for 3 minutes at 132° C. in a polymer melt mixing head and ground to a powder. The powder cured to a thermoset at 200° C. in 240 seconds (4.0 min.).

EXAMPLE 9

A glycidyl-terminated polyester adduct was prepared by charging a polymer melt mixing head at 132° C. with 57.89 g of a carboxylated polyester resin (Rucote 915; 38 AN) and 12.11 g diglycidyl orthophthalate (149 EEW). The blend was melt mixed for 90 minutes. The resulting adduct had an acid number of 5.1, a midpoint $T_g$ of 50° C., and contained 0.73% oxirane oxygen (2200 EEW). The carboxyl conversion was about 84%. A solid mixture was prepared from 35.79 g of this adduct, 13.21 g of a carboxylated polyester (Rucote 551; 86 AN), and 21.00 g titanium dioxide. The mixture was blended for 3 minutes at 132° C. in a polymer melt mixing head and ground to a powder. The powder cured to a thermoset at 200° C. in 300 seconds (5.0 min.).

The following two examples were conducted according to the disclosure in U.S. Pat. No. 4,112,012.

COMPARATIVE EXAMPLE F

A preheated polymer melt mixing bowl was charged with a mixture containing 39.58 g of a branched carboxylated polyester resin (Cargill 30-3051), 9.42 g diglycidyl terephthalate, and 21.00 g titanium dioxide. The mixture was fluxed at 132° C. for 4 minutes. The blend, which cured to a thermoset at 200° C. in 100 seconds, was ground to a fine powder. A container was ⅔ filled with the powder and placed in a water bath at 45° C. The sample volume contracted, and the powder sintered during 24 hours at this temperature.

COMPARATIVE EXAMPLE G

A preheated polymer melt mixing bowl was charged with a mixture containing 38.72 g of a carboxylated polyester resin (Cargill 30-3051), 10.28 g diglycidyl isophthalate, and 21.00 g titanium dioxide. The mixture was fluxed at 132° C. for 3 minutes. The blend, which cured to a thermoset at 200° C. in 115 seconds, was ground to a fine powder. A container was ⅔ filled with the powder and placed in a water bath at 45° C. The sample volume contracted, and the powder sintered during 24 hours at this temperature.

COMPARATIVE EXAMPLE H

A preheated polymer melt mixing bowl was charged with a mixture containing 13.71 g of a branched carboxylated polyester resin (Rucote 551), 29.18 g of a linear carboxylated polyester resin (Rucote 915), 6.11 g diglycidyl isophthalate, and 21.00 g titanium dioxide. The mixture was fluxed at 132° C. for 5 minutes. The blend, which had a midpoint $T_g$ of 42° C., did not cure at 200° C. in 20 minutes. A glass container was ⅔ filled with the powdered blend and placed in a water bath at 45° C. The sample partially sintered during 24 hours at this temperature.

EXAMPLE 10

| Experimental formulation 10(a): | |
|---|---|
| Material | Parts |
| Glycidyl-terminated Polyester Adduct of Example 6(a) | 538 |
| Cargill 30-3051 (AN 101) | 142 |
| Modarez MFP | 12 |
| Benzoin | 8 |
| Choline Chloride | 1.2 |
| Titanium dioxide (R-900) | 300 |

Melt temperature: 100° C.

The system described in Example 10(a) is useful in powder coatings as a replacement for co-reactants in current systems which contain either hazardous triglycidyl isocyanurate, or a curative that produces a volatile byproduct, or an epoxy resin containing bisphenol-A. The advantage is that a powder coating formulation is obtained which contains a binder resin blend that cures to a thermoset in less than 10 minutes at 200° C., displays resistance to UV exposure, and does not sinter to an intractable mass upon storage at hot ambient conditions.

| Material | Parts |
|---|---|
| Experimental formulation 10(b) (TGIC): | |
| Cargill 30-3065 polyester (AN 35) | 1638 |
| Triglycidyl isocyanurate (TGIC) | 1231 |
| Modarez MFP | 24 |
| Benzoin | 15 |
| Titanium dioxide | 1200 |
| Melt temperature: 105° C. | |
| Experimental formulation 10(c) (β-hydroxyalkylamide) | |
| Cargill 30-3065 polyester (AN 35) | 1674 |
| Primid XL-552 (β-hydroxyalkylamide) | 88 |
| Modaflow III | 22.5 |
| Benzoin | 15 |
| Titanium dioxide | 1200 |
| Melt temperature: 138° C. | |
| Experimental formulation 10(d) ("hybrid") | |
| Cargill 30-3051 polyester (AN 101) | 417 |
| EPON 1001F epoxy resin (715 EEW) | 112 |
| EPON 2002 eopxy resin (500 EEW) | 150 |
| Modarez MFP | 12 |
| Benzoin | 8 |
| Choline chloride | 2 |
| Titanium dioxide | 300 |

Melt temperature: 104° C.

EXAMPLE 11

Performance Data (See Tables IV, V, and VI).

TABLE IV

Physical Properties of Cured Coatings
Cure Conditions: 205° C. for 15 min.

| Initial Physical Property | ASTM Test | Example 10(a) | Control Example 10(b) | Control Example 10(c) | Control Example 10(d) |
|---|---|---|---|---|---|
| Film Thickness (mils) | D-1186 | 1.7 | 1.8 | 2.0 | 1.8 |
| Gloss, 60° | D-523 | 85 | 92 | 92 | 94 |
| Impact - direct (in-lbs) | D-2794 | 50 | 90 | 130–140 | 150–160 |
| Impact - reverse (in-lbs) | D-2794 | 20 | 80 | 80 | 160 |
| Conical Bend (% pass) | D-522 | 100 | 100 | 100 | 100 |
| Hardness, pencil (no cut) | D-3363 | 2–3H | 3H | 2–3H | 2H |
| Crosshatch - Adhesion (% pass) | D-3359 | 100 | 100 | 100 | 100 |

TABLE V

Physical Properties of Cured Coatings
Retention of Gloss to UV Exposure

| UV (Bulb-B) Exposure Hours | Example 10(a) | Control Example 10(b) | Control Example 10(c) | Control Example 10(d) |
|---|---|---|---|---|
| Initial | 83% | 93% | 93% | 93% |
| 100 | 84 | 88 | 92 | 19 |
| 245 | 68 | 86 | 92 | 3 |
| 500 | 18 | 30 | 29 | 1 |
| 750 | 12 | 25 | 24 | 1 |
| 1000 | 8 | 22 | 22 | 1 |

This invention has been described in terms of specific embodiments set forth in detail. It should be understood, however, that these embodiments are presented by way of illustration only, and that the invention is not necessarily limited thereto. Modifications and variations within the spirit and scope of the claims that follow will be readily apparent from this disclosure, as those skilled in the art will appreciate.

TABLE VI

Physical Properties of Cured Coatings
Yellowness Index (YI) Upon UV Exposure

| UV (Bulb-B) Exposure Hours | Example 10(a) | Control Example 10(b) | Control Example 10(c) | Control Example 10(d) |
|---|---|---|---|---|
| Initial | −0.57 | 0.34 | 3.82 | −2.35 |
| 100 | 0.15 | 0.30 | 2.66 | 6.68 |
| 245 | 0.37 | −0.30 | 2.12 | 7.51 |
| 500 | 0.50 | 0.58 | 2.43 | 8.22 |
| 750 | 0.47 | 0.29 | 1.93 | 8.13 |
| 1000 | 0.43 | 0.36 | 1.91 | 8.40 |

EXAMPLE 12

(a) Preparation of Dicarboxylated Polyester I. A 3 liter resin kettle was charged with 1050 g neopentyl glycol and 856 g purified terephthalic acid. The stirred slurry was heated to 150° C. where an additional 700 g of terephthalic acid and 2.36 g of hydrated monobutyl tin oxide (Fascat 4100; M&T Chemicals) were added. The reaction mixture was heated to 238° C. and maintained at this temperature until the acid number decreased to 3 (15 hours), and 315 mL of water distillate were collected. Isophthalic acid (227 g) was charged, and the reaction mixture heated at 238° for 6.5 hours. The final dicarboxylated polyester had an acid number of 41 and an I.C.I. melt viscosity of 26 poise (200° C.).

(b) Polyglycidyl Adduct I of Dicarboxylated Polyester I. A glycidyl-terminated polyester adduct was prepared by charging a polymer melt mixing head (C. W. Brabender) at 132° C. with 53.02 g of dicarboxylated polyester I and 0.063 g choline chloride. The blend was fluxed for 10 minutes until temperature and torque readings were constant. Diglycidyl isophthalate (11.98 g; 151 EEW) was added and the blend melt mixed for 75 minutes. The resulting adduct had an acid number of 2.7, a midpoint Tg of 57° C., and contained 0.88% oxirane oxygen (1800 EEW). The carboxyl conversion was about 92%. The adduct did not transform into an intractable thermoset upon heating at 200° C. for 20 minutes.

(c) Preparation of Polycarboxylated Polyester II. A 3 liter resin kettle was charged with 1014 g neopentyl glycol and 1097 g purified terephthalic acid. The stirred slurry was heated to 143° C. where an additional 400 g of terephthalic acid and 2.82 g of hydrated monobutyl tin oxide were added.

The reaction mixture was heated over a 4 hour period to 238° 0C. and maintained at this temperature until the acid number decreased to 4 (7 hours), and 300 mL of water distillate were collected. The melt temperature was decreased to 182° C. and 312 g of trimellitic anhydride added. The reaction mixture was heated an additional 40 minutes as the melt temperature increased to 213° C. The polymer was then poured into a metal tray. The final product, a branched polycarboxylated polyester, had an acid number of 78 and an I.C.I. melt viscosity of 35 poise (200° C.).

(d) Cure of Adduct I with Polycarboxylated Polyester II. A powder blend containing 0.207 g of polycarboxylated polyester II, 0.492 g of polyglycidyl adduct I, 0.300 g titanium dioxide, and 0.0012 g choline chloride was mixed on a hot plate at 200° C. The mixture formed an intractable thermoset within 265 seconds (4.4 min.).

(e) A melt blend of the above ingredients was prepared at 132° C. and ground to a fine powder. The powder was added to a glass container (⅔ full) and placed in a water bath at 45° C. The sample did not sinter or contract in volume during 24 hours at this temperature.

COMPARATIVE EXAMPLE I

The following example was prepared according to the disclosure in U.S. Pat. No. 4,463,140 which discloses a powder coating mixture containing 1.9-9.0 wt % diglycidyl phthalate and a polyester with an acid number between 10 and 30. Example 2A from U.S. Pat. No. 4,463,140 was chosen as a comparison example because it was believed that it would give the best performance in the powder stability test. It was found that this formulation did not cure to a thermoset within 20 minutes.

This example follows the procedure for preparing a polycarboxylated polyester as described in example 2A U.S. Pat. No. 4,463,140. A 3 liter resin kettle was charged with 568 g neopentyl glycol, 16.0 g trimethylolpropane, and 685.5 g of purified terephthalic acid. The mixture was heated to 140° C. and 0.77 g of hydrated monobutyl tin oxide was added. The reaction mixture was heated over a 5 hour period to 238° C. and maintained at this temperature until the acid number decreased to 5 (1 hour), and 132 mL of water distillate were collected. The melt temperature was decreased to 197° C. and 261 g of isophthalic acid was added. The reaction mixture was heated at 238° C. for an additional 5.5 hours while collecting an additional 28 mL of water distillate. The molten polyester was then poured into a metal tray. The polycarboxylated polyester had an acid number of 28, a midpoint Tg of 70° C., and an I.C.I. melt viscosity of 31.5 poise (200° C.).

A polymer melt mixing head, preheated to 130° C., was charged with a mixture of 39.70 g (19.8 meq carboxyl) of the above polycarboxylated polyester, 2.99 g (21.5 meq epoxy) diglycidyl terephthalate (139 EEW), 21.35 g titanium dioxide, 0.64 g Resiflow P-67 (acrylic polymer; Estron Chem. Inc.; 67% active), and 0.32 g of benzoin. The mixture was fluxed for 5 minutes at 45 rpm, cooled, and ground to a fine powder. The powder did not cure to a thermoset at 200° C. in 20 minutes. A portion of the powder was added to a glass container (⅔ full) and placed in a water bath at 45° C. After 24 hours at this temperature, the sample had contracted slightly in volume, and it was difficult to return the material to a free-flowing powder.

The above formulation was altered by adding a catalyst and changing the stoichiometry to a slight excess of carboxyl to epoxy groups. The mixing head, preheated to 130° C., was charged with a mixture of 40.09 g (20.0 meq carboxyl) of the above polycarboxylated polyester, 2.60 g (18.7 meq epoxy) diglycidyl terephthalate (139 EEW), 21.35 g titanium dioxide, 0.64 g Resiflow P-67, 0.32 g of benzoin, and 0.108 g choline chloride (60% active). The mixture was fluxed at 125° C. for 5 minutes at 40 rpm and cooled to room temperature. The blend still did not cure to a thermoset at 200° C. within 20 minutes.

COMPARATIVE EXAMPLE J

This example demonstrates that the TGIC of Toyoda et al. (U.S. Pat. No. 5,250,634) cannot be replaced by diglycidyl isophthalate (DGI). TGIC has 3 glycidyl groups per molecule, whereas DGI has 2 glycidyl groups per molecule. A gelled thermoset is not obtained with a linear carboxyl-terminated polyester (such as the EMS P7309 used by Toyoda et al.), using only DGI because a glycidyl functionality greater than 2 is needed for gelation to occur with the Toyoda polyester.

A blend containing EMS P7309 (0.50 g), a glycidyl-terminated polyester (0.50 g) made from diglycidyl isophthalate and Rucote 915, titanium dioxide (0.56 g), benzoin (0.009 g), and Modarez MFP (0.003 g) was prepared. The mixture was placed on hot plate at 200° C. and melt mixed. Gelation did not occur within 20 minutes at 200° C.

EXAMPLE 13

Preparation of the epoxy polyesters (i.e., glycidyl-terminated polyesters) in a static mixer.

An apparatus was assembled wherein molten streams of a carboxyl-terminated polyester and a diglycidyl phthalate could be mixed in a specified time and temperature to give carboxyl conversions greater than 85% and continuously form a glycidyl-terminated polyester with consistent properties. Thus, 700 g of Rucote 915 (39 acid number) was heated to 200° C. in a vessel and 0.39 g tetramethylammonium chloride catalyst added to the molten polyester. The polyester was agitated until the catalyst dissolved. In a separate vessel 170 g of diglycidyl isophthalate was melted at 80° C. and maintained at this temperature. Both streams were then pumped into a static mixer, heated at 195° C., at a rate of 6.0 g/min of polyester and 1.4 g/min. of diglycidyl isophthalate. The static mixer consisted of a 22 in. by ⅛ in. diameter stainless steel tube containing 43 mixing elements. The theoretical residence time in the mixer was 4.9 minutes. Glycidyl-terminated polyester with an EEW of 1840, an acid number of 0.8–1.0 (>98% carboxyl conversion), and a melt viscosity (200° C.) of 51 poise was continuously produced.

COMPARATIVE EXAMPLE K

Because of the "branched" nature of the JP-118436 epoxy polyester (II), its thermal stability is significantly less than the linear or "slightly branched" epoxy polyester adducts of the present invention This was demonstrated by preparing a polyester according to the procedure in Example 1 of JP 54-118436 and reacting it with diglycidyl isophthalate.
Preparation of Polyester according to JP-118436 (Example 1)

A resin kettle was charged with 388.0 g methyl terephthalate, 124.6 g ethylene glycol, 212.0 g neopentyl glycol, and 0.176 g zinc acetate. The contents were heated with agitation from 140° to 200° C. over a 3 hour period. Methanol (121.9 g) was collected as a distillate during this period. Isophthalic acid (298.8 g) was then added to the kettle and the mixture heated from 200° to 240° C. over a 12 hour period. An additional 56.8 g of distillate were collected. The reaction mixture was cooled to 180° C., 38.2 g of trimellitic anhydride added, and the mixture heated to 240° C. and maintained at this temperature for 0.5 hr. The resin was then poured into metal trays to solidify. The product was a clear, brittle solid with an acid number of 33.

The polyester was mixed with diglycidyl isophthalate (2.1 epoxy equiv. per carboxyl equiv.) at 200° C. Within 15–20 minutes, the mixture gelled to the extent that the mass no longer flowed at 200° C. In contrast, an epoxy polyester prepared as described in Example 14 below from a linear polyester (I) and diglycidyl isophthalate did not gel within 30 minutes at 200° C. The molten polymer was still fluid after this time period.

EXAMPLE 14

Preparation of Glycidyl-terminated Polyester having >85% Carboxyl Conversion for Comparison Study The preparation was similar to the preparation of a gylcidyl-terminated polyester adduct in a static mixer which is described in Example 13, except that the carboxyl conversion is lower in this preparation.

An apparatus was assembled wherein molten streams of a carboxyl-terminated polyester and a digylcidyl phthalate could be mixed in a specified time and temperature to give carboxyl conversions greater than 85% and continuously from a glycidyl-terminated polyester with consisting properties. Thus, 700 g of Rucote 915 (36 acid number) was heated to 200° C. in a vessel and 0.39 g tetramethylammonium chloride catalysts added to the molten polyester. The polyester was agitated until the catalyst dissolved. In a separate vessel, 170 g of diglycidyl isophthalate was melted at 80° C. and maintained at this temperature. Both streams were then pumped into a static mixer, heated at 195° C., at a rate of 9.4 g/min. of polyester and 2.23 g/min. of diglycidyl isophthalate. The static mixer consisted of a 22 in. by ⅛ in. diameter stainless steel tube containing 43 mixing elements. Glycidyl-terminated polyester with an EEW of 1685, an acid number of 3.7 (~91% carboxyl conversion.), and a melt viscosity (200° C.) of 44 poise was continuously produced.

EXAMPLE 15

In this example,the glycidyl-terminated polyester adduct is cured with a catalyst rather than with a carboxyl-terminated polyester (II)

A glycidyl-terminated polyester (1.00 g), prepared from Rucote 915 and diglycidyl isophthalate, was dry mixed with 0.038 g dicyandiamide, 0.003 g 2-methylimidazole, 0.014 g Modarez MFP, and 0.70 g titanium dioxide. The mixture was placed on a hot plate at 200° C. and continuously mixed. The mixture cured to a thermoset in 355 seconds (5.9 minutes). When dicyandiamide and 2-methylimidazole were eliminated from the above formulation, the mixture did not cure within 1800 seconds (30 minutes) at 200° C.

I claim:

1. A powder coating composition comprising:
   (a) a resin comprising a polyglycidyl-terminated polyester formed from the reaction of a diglycidyl compound with a carboxylated polyester (I) having an average of about 2.0 equivalents of carboxyl groups and a number average molecular weight of at least about 1500, wherein said carboxylated polyester (I) is linear or slightly branched, wherein the amount of diglycidyl compound reacted with the carboxylated polyester (I) is sufficient to provide one mole of diglycidyl compound per carboxyl group of the carboxylated polyester (I), wherein said resin does not self-cure within 20 minutes at 200° C., and wherein the carboxyl group degree of reaction is greater than about 85%, and
   (b) a carboxylated polyester (II) having greater than about 2.5 free carboxyl groups per molecule and an acid number between about 50 and about 150 mg KOH/g.

2. A powder coating composition according to claim 1 which has a glass transition temperature of about 50° C. or greater and cures to a thermoset in about 20 minutes or less at about 200° C. to about 250° C.

3. A powder coating composition according to claim 1 which has a glass transition temperature of about 50° C. or greater and cures to a thermoset in about 10 minutes or less at about 200° C. to about 205° C.

4. A powder coating composition according to claim 1 which has a glass transition temperature of about 50° C. or greater, which cures to a thermoset in about 20 minutes or less at about 200° C. to about 250° C., and which does not sinter within 24 hours at a temperature of 45° C.

5. A powder coating composition according to claim 1 wherein the carboxylated polyester (II) has an acid number of about 70 to about 100 mg KOH/g.

6. A powder coating composition according to claim 1 wherein the diglycidyl compound is a diglycidyl ester of an aromatic dicarboxylic acid selected from diglycidyl phthalate, diglycidyl isophthalate, and diglycidyl terephthalate.

7. A powder coating composition according to claim 6 wherein the diglycidyl ester of an aromatic dicarboxylic acid is diglycidyl isophthalate.

8. A powder coating composition according to claim 1 wherein the carboxyl group degree of reaction is at least about 92%.

9. A powder coating composition according to claim 1 wherein the carboxyl group degree of reaction is at least about 95%.

10. A powder coating composition according to claim 1 wherein the carboxylated polyester (I) is linear.

11. A powder coating composition according to claim 1 wherein the carboxylated polyester (I) is slightly branched.

12. A powder coating composition according to claim 1 wherein the carboxylated polyester (I) is substantially aromatic.

13. A powder coating composition comprising:
    (a) a resin comprising a polyglycidyl-terminated polyester formed from the reaction of diglycidyl isophthalate with a carboxylated polyester (I) having an average of about 2.0 equivalents of carboxyl groups and a number average molecular weight of at least about 1500, wherein said carboxylated polyester (I) is linear or slightly branched, wherein the amount of diglycidyl isophthalate reacted with the carboxylated polyester (I) is sufficient to provide one mole of diglycidyl compound per carboxyl group of the carboxylated polyester (I), wherein said resin does not self-cure within 20 minutes at 200° C., and wherein the carboxyl group degree of reaction is greater than about 85%, and
    (b) a carboxylated polyester (II) having greater than about 2.5 free carboxyl groups per molecule and an acid number between about 50 and about 150 mg KOH/g, and wherein said powder coating composition has a glass transition temperature of about 50° C. or greater and cures to a thermoset in about 20 minutes or less at about 200° C. to about 250° C.

14. A powder coating composition according to claim 13 which has a glass transition temperature of about 50° C. or greater and cures to a thermoset in about 10 minutes or less at about 200° C. to about 205° C.

15. A powder coating composition according to claim 13 which has a glass transition temperature of about 50° C. or greater, which cures to a thermoset in about 20 minutes or less at about 200° C. to about 250° C., and which does not sinter within 24 hours at a temperature of 45° C.

16. A powder coating composition according to claim 13 wherein the carboxylated polyester (II) has an acid number of about 70 to about 100 mg KOH/g.

17. A powder coating composition according to claim 13 wherein the carboxyl group degree of reaction is at least about 92%.

18. A powder coating composition according to claim 13 wherein the carboxyl group degree of reaction is at least about 95%.

19. A powder coating composition according to claim 13 comprising:
    (a) a resin comprising a polyglycidyl-terminated polyester formed from the reaction of diglycidyl isophthalate with a substantially aromatic linear or slightly branched carboxylated polyester (I) having an average of about 2.0 equivalents of carboxyl groups and a number average molecular weight of at least about 1500, wherein the amount of diglycidyl isophthalate reacted with the carboxylated polyester (I) is sufficient to provide one mole of diglycidyl compound per carboxyl group of the carboxylated polyester (I), wherein said resin does not self-cure within 20 minutes at 200° C., and wherein the carboxyl group degree of reaction is greater than about 85%, and
    (b) a carboxylated polyester (II) having greater than about 2.5 free carboxyl groups per molecule and an acid number between about 50 and about 150 mg KOH/g, and wherein said powder coating composition has a glass transition temperature of about 50° C. or greater, cures to a thermoset in about 20 minutes or less at about 200° C. to about 250° C., and does not sinter within 24 hours at a temperature of 45° C.

20. A powder coating composition according to claim 19 wherein the carboxylated polyester (II) has an acid number of about 70 to about 100 mg KOH/g.

21. A powder coating composition according to claim 19 wherein the carboxyl group degree of reaction is at least about 92%.

22. A powder coating composition according to claim 19 wherein the carboxyl group degree of reaction is at least about 95%.

23. A powder coating composition according to claim 19 wherein the carboxylated polyester (I) is linear.

24. A powder coating composition according to claim 19 wherein the carboxylated polyester (I) is slightly branched.

25. A powder coating composition according to claim 13 wherein the carboxylated polyester (I) is linear.

26. A powder coating composition according to claim 13 wherein the carboxylated polyester (I) is slightly branched.

27. A powder coating composition according to claim 13 wherein the carboxylated polyester (I) is substantially aromatic.

28. A process for preparing a glycidyl ester-based powder coating composition which comprises:

(a) forming a resin comprising a glycidyl-terminated polyester adduct by reacting, optionally, in the presence of a catalyst, a diglycidyl compound with a carboxylated polyester (I) having an average of about 2.0 equivalents of carboxyl groups and a number average molecular weight of at least about 1500, wherein said carboxylated polyester (1) is linear or slightly branched, wherein the amount of diglycidyl compound reacted with the carboxylated polyester (I) is sufficient to provide one mole of diglycidyl compound per carboxyl group of the carboxylated polyester (I), wherein said resin does not self-cure within 20 minutes at 200° C., and wherein the carboxyl group degree of reaction is greater than about 85%, and (b) melt blending about 50 to about 80 weight percent of said glycidyl-terminated polyester adduct with about 50 to about 20 weight percent of a carboxylated polyester (II) having greater than about 2.5 free carboxyl groups per molecule and an acid number of about 50 to about 150.

29. A process according to claim 28 wherein the carboxylated polyester (I) is a linear polyester.

30. A process according to claim 28 wherein the carboxylated polyester (I) is a slightly branched polyester.

31. A process according to claim 28 wherein the carboxylated polyester (I) is a substantially aromatic polyester.

32. A process according to claim 28 wherein the carboxylated polyester (II) has an acid number of about 70 to about 100 mg KOH/g.

33. A process according to claim 28 wherein the diglycidyl compound is a diglycidyl ester of an aromatic dicarboxylic acid selected from diglycidyl phthalate, diglycidyl isophthalate, and diglycidyl terephthalate.

34. A process according to claim 33 wherein the diglycidyl ester of an aromatic dicarboxylic acid is diglycidyl isophthalate.

35. A process according to claim 28 wherein about 70 to about 80 weight percent of polyglycidyl-terminated polyester adduct is melt blended with about 30 to about 20 weight percent of the carboxylated polyester (II).

36. A process according to claim 28 wherein the carboxyl group degree of reaction is at least about 92%.

37. A process according to claim 28 wherein the carboxyl group degree of reaction is at least about 95%.

38. A process according to claim 28 for preparing a glycidyl ester-based powder coating composition which comprises:

(a) forming a resin comprising a glycidyl-terminated polyester adduct by reacting, optionally, in the presence of a catalyst, a diglycidyl compound with a carboxylated polyester (I) having an average of about 2.0 equivalents of carboxyl groups and a number average molecular weight of at least about 1500, wherein said carboxylated polyester (1) is linear or slightly branched, wherein the amount of diglycidyl compound reacted with the carboxylated polyester (I) is sufficient to provide one mole of diglycidyl compound per carboxyl group of the carboxylated polyester (I), wherein said resin does not self-cure within 20 minutes at 200° C., and wherein the carboxyl group degree of reaction is greater than about 85%, and (b) melt blending about 50 to about 80 weight percent of said glycidyl-terminated polyester adduct with about 50 to about 20 weight percent of a carboxylated polyester (II) having greater than about 2.5 free carboxyl groups per molecule and an acid number of about 50 to about 150.

and wherein said powder coating composition has a glass transition temperature of about 50° C. or greater, cures to a thermoset in about 20 minutes or less at about 200° C. to about 250° C., and does not sinter within 24 hours at a temperature of 45° C.

* * * * *

UNITED STATES PATENT AND TRADEMARK OFFICE
CERTIFICATE OF CORRECTION

PATENT NO. : 5,777,045
DATED : July 7, 1998
INVENTOR(S) : Lawrence J. Carr

It is certified that error appears in the above-identified patent and that said Letters Patent is hereby corrected as shown below:

| Col. | Line | |
|---|---|---|
|  |  | (Cover, TITLE) and col. 1, line 1, "Power Coatings" should read "Powder Coatings" |
| 1 | 44 | "coating, thus rendering" should read --coating, thus rendering it-- |
| 4 | 40 | "from about 55° 0C. to" should read --from about 55° C. to-- |
| 12 | 4 | "hydoxyalkylamide" should read --hydroxyalkylamide-- |
| 12 | 61 | (Table II, 245 Exposure Hours, Example 4) "58" should read --68-- |
| 16 | 49 | "Titanium dioxide" should read --Titanium dioxide (R-900)-- |
| 20 | 30 | "methyl" should read --dimethyl-- |
| 24 | 44 | "about 150." should read --about 150,-- |

Signed and Sealed this

Thirtieth Day of March, 1999

Attest:

Q. TODD DICKINSON

*Attesting Officer*     *Acting Commissioner of Patents and Trademarks*